US009552494B1

(12) United States Patent
Rogers et al.

(10) Patent No.: US 9,552,494 B1
(45) Date of Patent: Jan. 24, 2017

(54) PROTECTED INDEXING AND QUERYING OF LARGE SETS OF TEXTUAL DATA

(71) Applicant: TERBIUM LABS LLC, Baltimore, MD (US)

(72) Inventors: Daniel J. Rogers, Baltimore, MD (US); Tyler Carbone, Suffern, NY (US); Dionysus Blazakis, Parkville, MD (US)

(73) Assignee: TERBIUM LABS LLC, Baltimore, MD (US)

( * ) Notice: Subject to any disclaimer, the term of this patent is extended or adjusted under 35 U.S.C. 154(b) by 0 days.

(21) Appl. No.: 15/233,117

(22) Filed: Aug. 10, 2016

(51) Int. Cl.
  *G06F 21/62* (2013.01)
  *G06F 17/30* (2006.01)
  *H04L 9/06* (2006.01)
  *G06F 21/72* (2013.01)
  *G06F 21/76* (2013.01)

(52) U.S. Cl.
  CPC ..... *G06F 21/6227* (2013.01); *G06F 17/30628* (2013.01); *G06F 17/30675* (2013.01); *G06F 21/72* (2013.01); *G06F 21/76* (2013.01); *H04L 9/0643* (2013.01)

(58) Field of Classification Search
  None
  See application file for complete search history.

(56) References Cited

U.S. PATENT DOCUMENTS

| 5,694,594 A | 12/1997 | Chang |
| 6,185,553 B1 | 2/2001 | Byrd et al. |
| 7,098,815 B1 | 8/2006 | Samuels et al. |
| 8,099,415 B2 | 1/2012 | Luo et al. |
| 8,527,516 B1 | 9/2013 | Spasojevic et al. |
| 9,171,173 B1 | 10/2015 | Rogers et al. |
| 2007/0005594 A1* | 1/2007 | Pinkas ............... G06F 21/6263 |
| 2010/0332481 A1 | 12/2010 | Rowney |
| 2012/0016884 A1 | 1/2012 | Rowney et al. |
| 2014/0245443 A1 | 8/2014 | Chakraborty |

OTHER PUBLICATIONS

Bellovin et al., "Privacy-Enhanced Searches Using Encrypted Bloom Filters," Columbia University, Technical Report CUCS-034-07, Sep. 2007.

De Cristofaro et al., "Practical Private Set Intersection Protocols with Linear Computational and Bandwidth Complexity," University of California, Irvine, 2010.

Dong et al., "When Private Set Intersection Meets Big Data: An Efficient and Scalable Protocol," Proceedings of the 2013 ACM SIGSAC Conference on Computer & Communications Security, Nov. 4-8, 2013, Berlin, DE.

(Continued)

*Primary Examiner* — Michael R Vaughan
(74) *Attorney, Agent, or Firm* — Patent Portfolio Builders PLLC

(57) ABSTRACT

A protected querying technique involves creating shingles from a query and then fingerprinting the shingles. The documents to be queried are also shingled and then fingerprinted. The overlap between adjacent shingles for the query and the documents to be queried is different, there being less, or no overlap for the document shingles. The query fingerprint is compared to the fingerprints of the documents to be queried to determine whether there are any matches.

23 Claims, 10 Drawing Sheets

(56) References Cited

OTHER PUBLICATIONS

Freedman et al., "Efficient Private Matching and Set Intersection," Advances in Cryptology, 2004, EUROCRYPT, May 2-6, 2004, Interlaken, CH.

Gentry, "A Fully Homomorphic Encryption Scheme," A dissertation submitted to the Department of Computer Science and the Committee on Graduate Studies of Stanford University in partial fulfillment of the requirements for the Degree of Doctor of Philosophy, Sep. 2009.

Goh, "Secure Indexes," Stanford University, May 5, 2004.

Jarecki et al., "Efficient Oblivious Pseudorandom Function with Applications to Adaptive OT and Secure Computation of Set Intersection," Proceedings of the 6th Theory of Cryptography Conference on Theory of Cryptography, Mar. 15-17, 2009, San Francisco, CA, US.

Kerschbaum, "Outsourced Private Set Intersection Using Homomorphic Encryption," ASIACCS '12, May 2-4, 2012, Seoul, KR.

Kissner et al., "Privacy-Preserving Set Operations," Carnegie Mellon University Research Showcase @ CMU, Department of Electrical and Computer Engineering, Carnegie Institute of Technology, Feb. 2005.

Klimt et al., "Introducing the Enron Corpus," First Conference on Email and Anti-Spam, CEAS 2004, Jul. 30-31, 2004, Mountain View, CA, US.

Kornblum, "Identifying almost identical files using context triggered piecewise hashing," Digital Investigation, Sep. 2006, pp. S91-S97, vol. 3S.

Manning et al., "An Introduction to Information Retrieval," Apr. 1, 2009, Cambridge University Press, Cambridge, UK.

Ogata et al., "Oblivious keyword search," Journal of Complexity, Apr.-May 2004, pp. 356-371, vol. 20, Nos. 2-3.

Ostrovsky et al., "Private Searching on Streaming Data," CRYPTO 2005, Sep. 2, 2005.

Percival, "Stronger Key Derivation Via Sequential Memory-Hard Functions," BSDCan 2009, May 8-9, 2009, Ottawa, CA.

Provos et al., "A Future-Adaptable Password Scheme," Proceedings of the FREENIX Track: 1999 USENIX Annual Technical Conference, Jun. 6-11, 1999, Monterey, CA, US.

Rabin, "How to Exchange Secrets with Oblivious Transfer," Technical Report TR-81, Aiken Computation Lab, Harvard University, May 20, 1981.

Tridgell, "Efficient Algorithms for Sorting and Synchronization," A thesis submitted for the degree of Doctor of Philosophy at The Australian National University, Feb. 1999.

\* cited by examiner

| row | col_fam: col_qual | timestamp | value |
|---|---|---|---|
| 4d8a6cd0a8ac36129f748629d53 | "document": 5e574f63b7f9d40162f3ef8eb5 | 1412094949 | |

Figure 5A

| row | col_fam: col_qual | timestamp | value |
|---|---|---|---|
| 5e574f63b7f9d40162f3ef8eb5 | "hashed_salted_shingle": 4d8a6cd0a8ac36129f748629d53 | 1412094949 | |

Message-ID:
<1661159.1075857583466.JavaMail.evans@thyme>
Date: Fri, 10 Nov 2000 05:57:00 -0800 (PST)
To: john.arnold@enron.com
Subject: RE: Resume
Mime-Version: 1.0
Content-Type: text/plain; charset=us-ascii
Content-Transfer-Encoding: 7bit
X-To: John.Arnold@enron.com
X-Folder:
\John_Arnold_Dec2000\Notes Folders\
Discussion threads

Figure 9B

Message-ID:
<10404491.1075857572270.JavaMail.evans@thyme>
Date: Fri, 10 Nov 2000 05:57:00 -0800 (PST)
To: john.arnold@enron.com
Subject: RE: Resume
Mime-Version: 1.0
Content-Type: text/plain; charset=us-ascii
Content-Transfer-Encoding: 7bit
X-To: John.Arnold@enron.com
X-Folder:
\John_Arnold_Dec2000\Notes Folders\
All documents

Figure 9C

Message-ID:
<12452384.1075857585618.JavaMail.evans@thyme>
Date: Fri, 10 Nov 2000 05:57:00 -0800 (PST)
To: john.arnold@enron.com
Subject: RE: Resume
Mime-Version: 1.0
Content-Type: text/plain; charset=us-ascii
Content-Transfer-Encoding: 7bit
X-To: John.Arnold@enron.com
X-Folder:
\John_Arnold_Dec2000\Notes Folders\
Notes inbox

US 9,552,494 B1

PROTECTED INDEXING AND QUERYING OF LARGE SETS OF TEXTUAL DATA

CROSS REFERENCE TO RELATED APPLICATIONS

This application relates to Provisional Application No. 62/058,759, filed Oct. 2, 2014, Provisional Application No. 62/110,644, filed Feb. 2, 2015, and Non-Provisional application Ser. No. 14/642,886, filed on Mar. 10, 2015 (now U.S. Pat. No. 9,171,173) the entire disclosures of which are herein expressly incorporated by reference.

BACKGROUND OF THE INVENTION

Exemplary embodiments of the present invention are directed to searching documents. Searching for the occurrence of one or more words can currently be performed within documents using productivity software (e.g., a word processor, spreadsheet editor, presentation software, etc.), across documents using an operating system or computer system-wide searching application, as well as on the internet using a search engine. These search techniques typically require at least the search term(s) comprising the search query to be in plaintext form, and may require both the search term(s) as well as the document(s) being searched to be in plaintext form.

The rise of cloud-based data storage has renewed interest in protocols allowing private searching of encrypted or sensitive data in a public or untrusted environment. These protocols are known as Private Set Intersection (PSI) protocols, which are also referred to as Oblivious Keyword Search, or Private Information Retrieval. These techniques provide a blind search functionality to protect the plaintext of the original query from the database provider.

Many recent approaches to PSI involve protocols with a strict set of security assumptions. For example, many approaches require that the person making the query obtain no information about the provider's database beyond the results of the intersection between the query and the contents of the database. This can involve using an independent third party that restricts the set of legitimate queries to achieve these strict security requirements.

SUMMARY OF THE INVENTION

Although conventional PSI protocols achieve their intended purpose of protecting both the query and the data stored in the database, it has been recognized that this high level of security, as well as the attendant protocol complexity, is not necessary in all situations. There may be situations where the data of the database to be searched is publicly available but there is still a need to protect the data of the query itself. For example, a person may suspect that their Social Security Number has been compromised so they would want to search for it using an internet search engine but the person may be concerned about inputting their Social Security Number into an internet search engine. U.S. Pat. No. 9,171,173 ("the '173 patent") addresses these types of situations.

In contrast to conventional PSI protocols (which are concerned with protecting both the query and database) and the technique in the '173 patent (which is concerned with protecting the query and less concerned about protecting the database of publicly-available information), it has been recognized there are situations where protection of the database is of concern but not of the query itself. One exemplary situation could involve law enforcement data. For a variety of reasons various law enforcement agencies may not be willing to share their data with one another. Thus, for example, if a local law enforcement agency desired information about a particular suspect from the Federal Bureau of Investigations (FBI), the local law enforcement agency would have to request the FBI to run a search of its databases. Although this allows the entity holding the information to maintain control and decide whether to release any matching information to the local law enforcement agency, it shifts the burden of the search to the entity holding the information instead of the entity desiring the information.

This type of arrangement also increases the burden on the local law enforcement agency compared to a simple search of its own database, which can lead to situations where the local law enforcement agency decides not to make the extra effort to request another agency to search its own records. Such a situation may occur between two local law enforcement agencies because a requesting agency may decide the likelihood of data being present in another agency's database is too low to be worth the additional effort. This could lead to a suspect being released from custody even though the suspect has an outstanding warrant in other jurisdictions.

Accordingly, exemplary embodiments of the present invention are directed to identifying matches between a query and one or more protected documents in database, which can be queried using a relatively insecure query. If a match is identified the querying entity is provided with limited information about the match, such as an identification of the entity that provided the matching document to the database, and would need to contact the entity from which the documents originated to obtain access to the underlying document data. If the query is performed by a third party, the third party may not have access to the plaintext data of the protected documents or the query because both are secured by encryption.

An exemplary method in accordance with the present invention involves a processor receiving a plurality of artifact fingerprints generated from a plurality of artifacts. For ease of explanation the term artifact will be used to refer to the document(s) or other data being searched. The plurality of artifact fingerprints are generated by generating shingles from text within each of the plurality of artifacts and cryptographically hashing the shingles to generate a plurality of artifact fingerprints. The artifact fingerprints are stored in a database. The processor receives at least one query fingerprint from a querying entity and determines whether the received at least one query fingerprint matches any of the artifact fingerprints stored in the database. The querying party is provided with an indication of an entity that provided an artifact containing a matched fingerprint to the querying entity without revealing plaintext of the artifact containing the matched fingerprint. The plurality of artifact fingerprints are received from a plurality of different entities that generated the plurality of artifact fingerprints.

The at least one fingerprint of the query should preferably have lesser security than the fingerprints of the artifacts. This can be achieved using less character overlap between adjacent shingles created from the artifacts than adjacent shingles created from the query. It can also be achieved by removing common, easily guessed words from the artifacts prior to generation of the query fingerprint. Further protection can be achieved by identifying artificially common fingerprints and removing these from the set of query fingerprints before the artifact fingerprints are provided by the to the database provider.

Another exemplary method in accordance with the present invention involves a processor receiving a plurality of artifact fingerprints generated from a plurality of artifacts by generating shingles from text within each of the plurality of artifacts so that there is at least one character overlap between adjacent shingles and cryptographically hashing the shingles to generate a plurality of artifact fingerprints. The artifact fingerprints are stored in a database. The processor receives from a querying entity a plurality of query fingerprints generated by cryptographically hashing shingles of a plaintext query, wherein a character overlap between shingles generated from the plaintext query is greater than the at least one character overlap of the shingles generated from the artifacts. The processor determines whether any of the query fingerprints match any of the artifact fingerprints stored in the database by performing a cosine distance calculation. The querying entity is provided with an indication of an entity that provided an artifact containing a matched fingerprint.

A further exemplary method in accordance with the present invention involves a processor receiving a plurality of artifact fingerprints generated from each of the plurality of artifacts by generating shingles from text within each of the plurality of artifacts and cryptographically hashes the shingles to generate a plurality of artifact fingerprints. The artifact fingerprints are stored in a database. The processor also receives from a querying entity at least one query fingerprint and determines whether the received at least one query fingerprint matches any of the artifact fingerprints stored in the database. An indication of an entity that provided an artifact containing a matched fingerprint can be output to the querying entity without revealing plaintext of the artifact containing the matched fingerprints.

In other embodiments the at least one fingerprint can be selected from the artifact fingerprints and the match indicates a similarity between different artifacts within the database, which allows identification of copied or derivative texts.

BRIEF DESCRIPTION OF THE DRAWINGS

FIGS. 5A and 5B are block diagrams of exemplary techniques for storing fingerprinted artifacts in a database in accordance with the present invention;

FIG. 9A-9C are headers of three identical e-mail messages saved in different locations.

DETAILED DESCRIPTION

Figure 1:
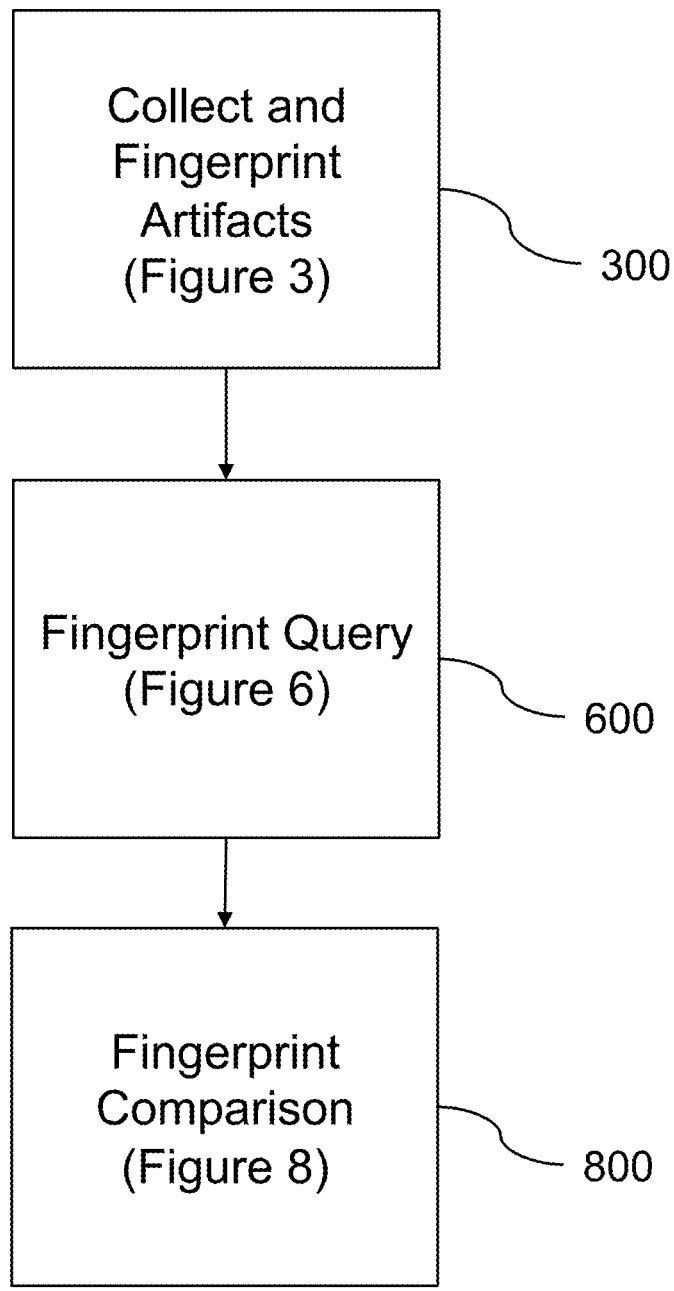
FIG. 1 is a flow diagram of the overall process of exemplary embodiments of the present invention.

FIG. 1 is a flow diagram of the overall process of exemplary embodiments of the present invention. As illustrated in FIG. 1, the overall process involves collecting and fingerprinting artifacts (step 300), fingerprinting a query (step 600), and then comparing the fingerprinted query against the fingerprinted artifacts to identify any matches (step 800). The details of each of these steps will be described below.

Figure 2:
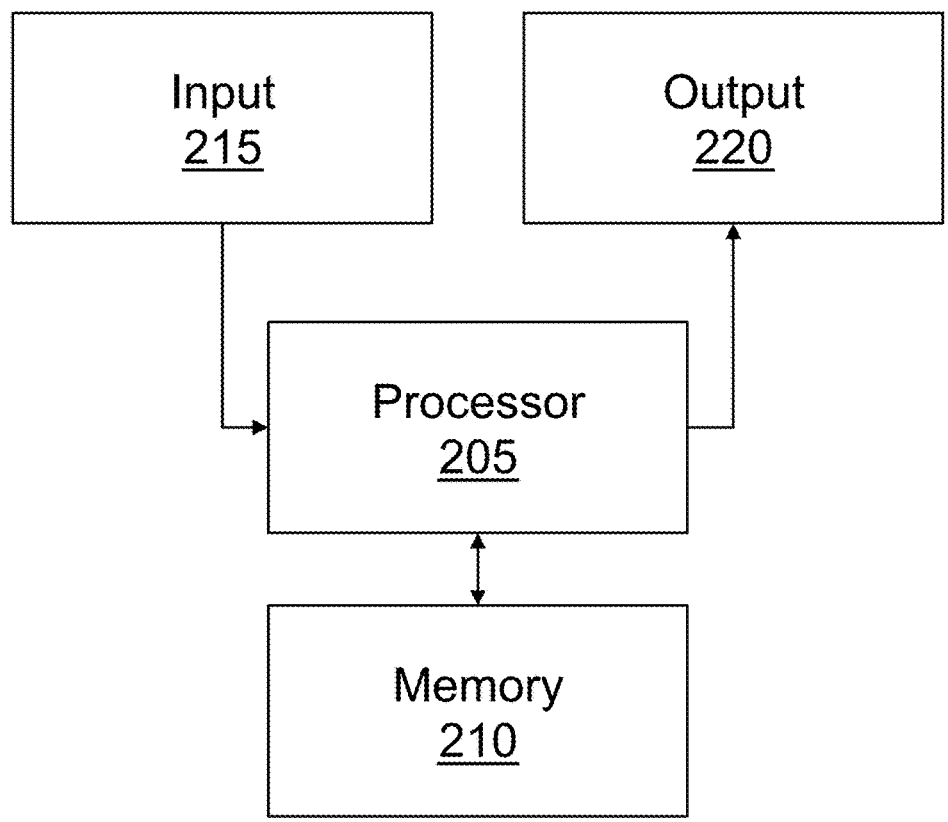
FIG. 2 is a block diagram of an exemplary system for generating and matching fingerprints in accordance with the present invention.

FIG. 2 is a block diagram of an exemplary system for generating and matching fingerprints in accordance with the present invention. The system 200 can comprise one or more computers that include a processor 205 coupled to memory 210, input 215, and output 220. The disclosed processes can be performed by processor 205 executing computer code stored in memory 210. The processor 205 can be any type of processor, including a microprocessor, field programmable gate array (FPGA), and/or an application specific integrated circuit (ASIC). Memory 210 can be any type of non-transitory memory. In addition to storing computer code for executing the processes described herein, memory 210 can also store the generated fingerprints. Alternatively or additionally, a separate storage medium can store the generated fingerprints. For example, the fingerprints can be stored in a distributed key value store or non-relational, distributed database, both of which are networks of computers connected together, and often running a distributed file system, such as the Hadoop Distributed File System (HDFS), to store information in a distributed and replicated manner. Such systems allow storage of far more information than can be stored on a single computer and enable efficient retrieval and linear scaling of required computational resources as data size grows. Typical distributed key stores include Google BigTable, Apache Accumulo, and Apache HBase.

Distributed key stores store data in simple structures consisting of a row, a column family, a column qualifier, a timestamp, and a value. In Apache HBase column families are fixed throughout a table, whereas column qualifiers can be different for each entry. Moreover, distributed key stores often have limited query capabilities compared to traditional Relationship Database Management Systems (RDBMS), which can accept Structured Query Language (SQL). In contrast, distributed key value stores typically only allow querying by row ID. Although this is more limiting, the distributed key value stores more efficiently handle large volumes of data distributed across multiple machines compared to RDBMS.

Input 215 provides mechanisms for controlling the disclosed processes, including, for example, a keyboard, mouse, trackball, trackpad, touchscreen, etc. Further, input 215 can include a connection to an external storage device for providing artifacts, such as an external hard drive or flash storage memory, as well as a network connection. Output 220 can include a display, printer, and/or the like. Additionally, output 220 can include a network connection for notifying a querying entity of a match between a query fingerprint and an artifact, such as by electronic mail, posting on a website or webpage, a text message, and/or the like.

As will be described in more detail below, in certain embodiments different entities will generate the fingerprints for the artifacts and the queries. For example, a first entity may operate the database containing the fingerprinted artifacts and a second entity may want to determine whether the database contains any matches for data that the second entity does not want revealed to the first entity. In this case the first entity can have a system such as that illustrated in FIG. 2 in order to collect artifacts, generate fingerprints from the artifacts and perform a fingerprint comparison, while the second entity can have a system such as that illustrated in FIG. 2 in order to generate the fingerprinted query that is then provided in the protected form to the first entity. The first entity can generate the fingerprinted artifacts from artifacts received from another entity or the another entity can perform the fingerprinting and then provide the fingerprinted artifacts to the first entity. Alternatively, the first entity can provide the fingerprinted artifacts to the second entity, which can then run the query on its own system(s).

Figure 3:
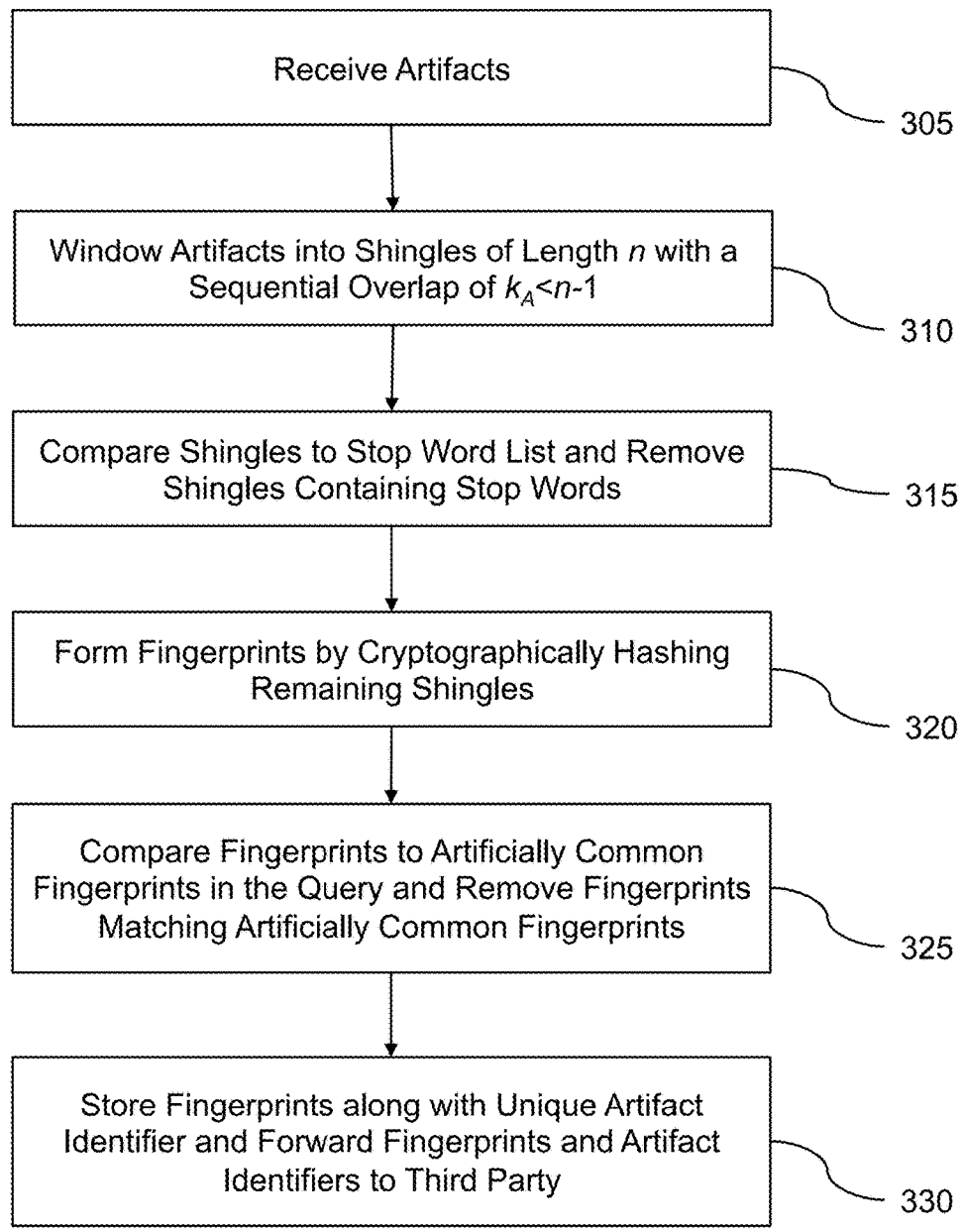
FIG. 3 is a flow diagram of an exemplary process for fingerprinting artifacts in accordance with the present invention.
Figure 4:
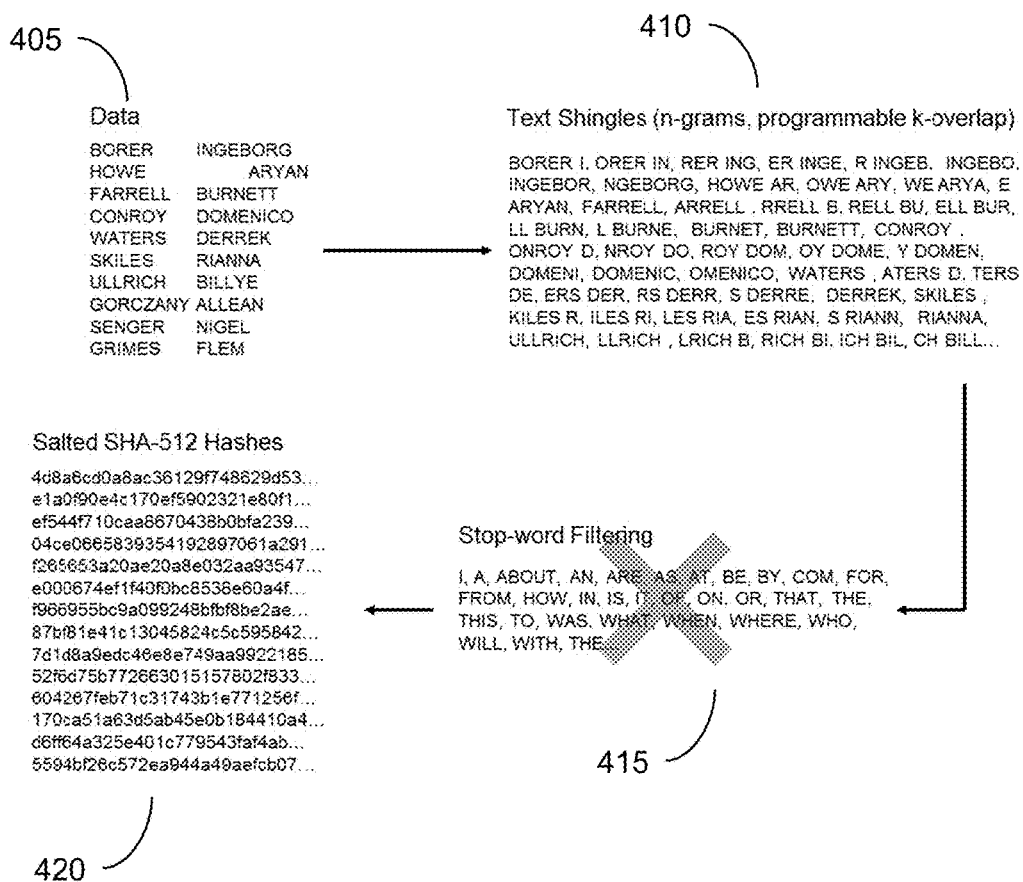
FIG. 4 is a block diagram of an exemplary process for fingerprinting artifacts in accordance with the present invention.

In the present invention the artifacts are the data that should be subjected to a high level of protection, and accordingly the generation of the fingerprinted artifacts can be performed on a system of the entity or entities that own or control the artifacts or on an independent, third-party's system that maintains the artifacts (both of which will be referred to as "the artifact maintainer"). Turning now to FIG. 3, the artifact maintainer's system 200 receives a set of artifacts via input 215, which are provided to processor 205 (step 305). Processor 205 then windows the plaintext artifacts into shingles of length n with a sequential overlap of $k_Q < n-1$ (step 310). An example of this is illustrated in FIG. 4 where a collection of data 405 of the query is windowed into a set of shingles 410. In this example the shingles have a length n=7, and accordingly the overlap is 6. This sequential overlap can be seen by the first shingle including "BORER I" and the second shingle including the last 6 characters of the first shingle and the first character following the end of the first shingle, i.e., "ORER IN". The shingles can also be subjected to additional, optional processing, such as replacing all whitespace by a single space and removing all punctuation. It should be recognized that the particular length n of the shingles does not need to be 7; it could be a different value depending on the desired security of the hash and granularity of the possible queries.

It should be noted that the length of the shingles n constructed from the artifacts and the plaintext query are the same but the overlap k is different. There is less overlap for the artifacts because this improves the security of the artifacts, whereas the security of the query is less of a concern. If there is no overlap between the artifact shingles then each shingle is completely independent of the other shingles. Thus, if one shingle were correctly guessed the security of the remaining shingles would remain intact. Accordingly, when the highest security is desired the shingle overlap of the query will be $k_A = 0$.

Returning again to FIG. 3, the shingles are then compared to a stop word list and matching shingles are removed 415 (step 315). Removing easily guessable stop words from the query further improves the security of the artifacts.

The shingles remaining after the stop word filtering are then formed into fingerprints using a cryptographic hashing algorithm (step 320). Prior to cryptographic hashing, a sequence of random characters can be appended to each shingle (commonly referred to as "salting") so long as the same sequence is added to each shingle of artifacts in the database as well as the shingles of the query. In the example illustrated in FIG. 4 the shingles are salted and then hashed using a Secure Hash Algorithm 512 (SHA-512). It should be recognized that this is only one exemplary type of cryptographic algorithm that can be employed with the present invention. One skilled in the art will recognize that the particular cryptographic algorithm chosen is a balance between the desired protection for the query (because the query will be subjected to the same cryptographic algorithm) and the amount of processing power, processing time, and storage space. Accordingly, the present invention can be implemented with any cryptographic algorithm to provide the desired protection to the underlying information.

The security of the artifacts can be further improved by removing fingerprints having hash values corresponding to those commonly appearing in the query (step 325). This can be achieved using a list of artificially common fingerprint values. The artificially common fingerprint values can be identified by performing the cosine distance calculation (described in more detail below) between each fingerprint in the artifact fingerprints and any cosine distances that are above a threshold value are identified as the artificially common fingerprints that are part of the set provided to the querying entity. Finally, processor 205 stores the cryptographically hashed shingles in a database 210 along with a unique artifact identifier and forwards this to the third party maintaining the artifact database (step 330). A third party can maintain the artifacts and queries can be submitted to the third-party's system or the artifacts can be forwarded from the third party to another entity to receive queries and run the queries against a database of artifacts. The third party can be a trusted or untrusted third party. For example, if the artifacts are fingerprinted by the artifact maintainer and the query is fingerprinted by the querying party then the third party can be an untrusted third party because encryption is applied to both the artifacts and query prior to being provided to the third party.

The unique artifact identifier allows the artifact to be quickly identified when there is a match between a fingerprinted shingle stored in the database and a fingerprinted query shingle. The unique artifact identifier can be, for example, a hash value computed for the entire artifact or any other unique identifier. Because the querying entity does not have access to the underlying data of the artifact due to the fingerprinting process, the querying entity can use the unique artifact identifier to request the underlying data from the entity or entities that own or control the identified artifact(s). Accordingly, the third party only has access to the protected artifact fingerprints and cannot access the underlying data of the artifacts without permission from the artifact maintainer and/or the entity that provided the artifact to the artifact maintainer.

If the artifact maintainer is a third-party then the fingerprinting of artifacts should be performed by a trusted third party instead of an untrusted third party because the third party is receiving the artifacts in an unencrypted form. Further, it should be recognized the fingerprinting of artifacts need not be a one-time process but instead can be a continual process and/or periodic process in which artifacts from one or more entities (e.g., different law enforcement agencies) can be fingerprinted and stored in one or more common databases for subsequent querying.

As discussed above in connection with FIG. 2, the fingerprints can be stored in a distributed key value store. Exemplary embodiments of the present invention use unique properties of distributed key value stores to construct a unique schema to store the fingerprints. FIGS. 5A and 5B illustrate two examples of ways to store fingerprints in a row of a distributed key value store using unique schema. In the schema illustrated in FIG. 5A the fingerprint is used as the row, column family is set to "document", the artifact identifier is the column qualifier, the time stamp represents when the data was entered into the row, and the value field is not used in the schema to save storage space. This schema allows a direct query of the distributed key value store using the fingerprints from the query to search for similar fingerprints even though the store does not contain any of the original content or index items consisting of literal extracted pieces of the original content.

Although exemplary embodiments are being described in connection with determining whether a query appears in one or more artifacts, the present invention can also be employed to identify any derivatives of artifacts by finding latent patterns and similarities between artifacts. In this case the different artifacts will be switched in and out as the fingerprinted query that is compared to the remaining fingerprinted artifacts. To simplify this process an inverted table, such as that illustrated in FIG. 5B can be employed in which the artifact identifier is stored as the row and the fingerprint is stored as the column qualifier. This secondary table allows construction of extremely efficient and highly parallel algorithms that directly measure cosine distance between two documents using an intermediate query system, such as Apache Pig. This derivative identification can be performed using a distributed graph database, such as Titan or Hama.

Figure 6:
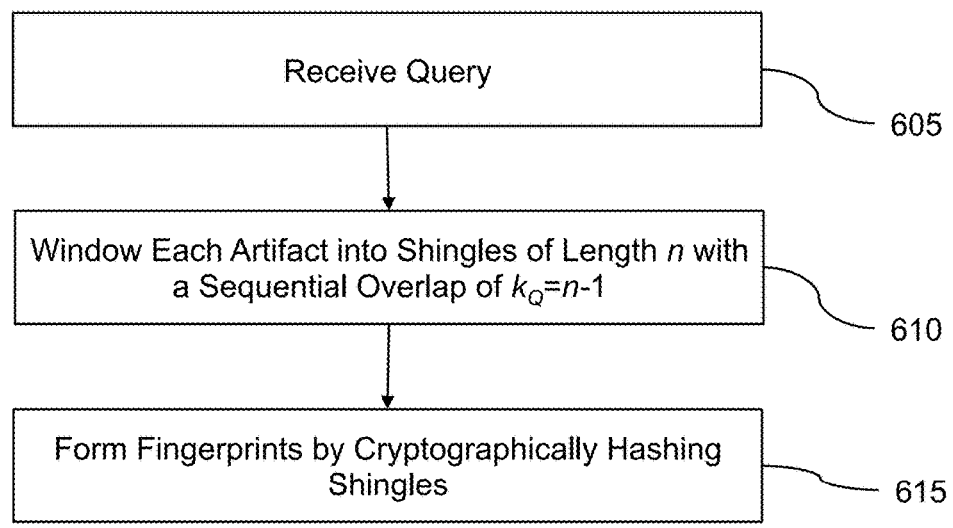
FIG. 6 is a flow diagram of an exemplary process for fingerprinting queries in accordance with the present invention.

Now that a database of fingerprinted artifacts has been created the system is ready to receive queries, which requires fingerprinting the queries using the method illustrated in FIG. 6.

Figure 7:
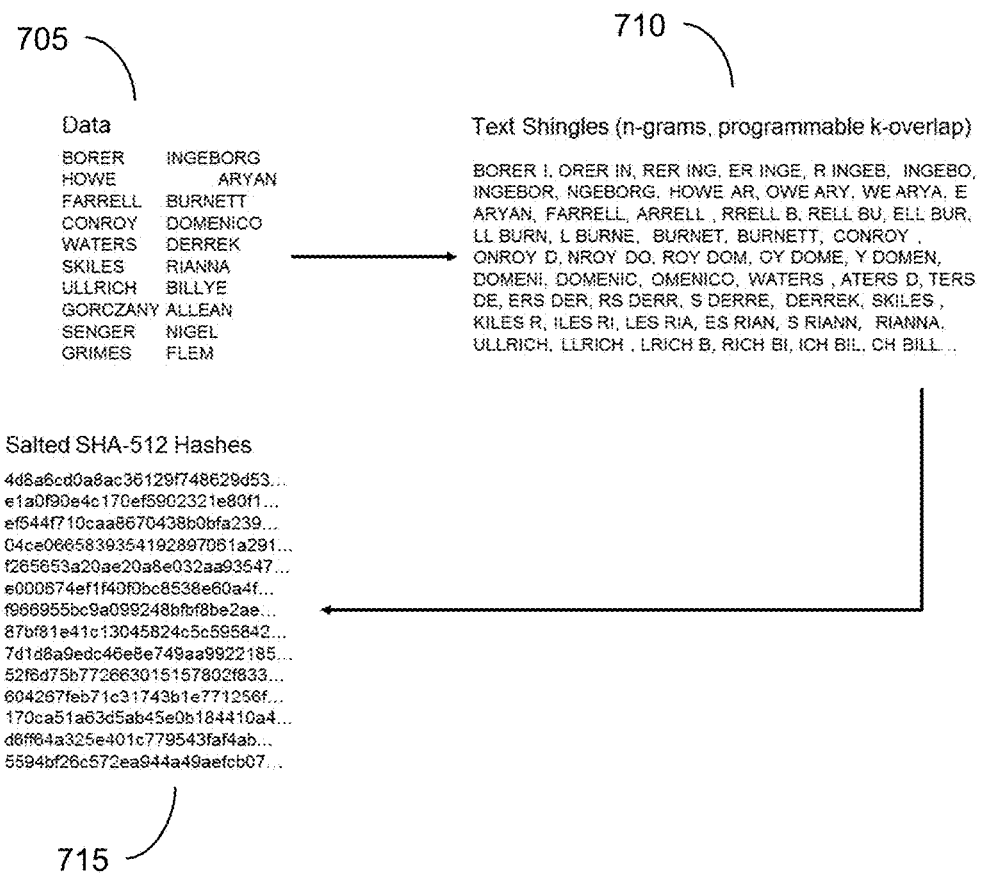
FIG. 7 is a block diagram of an exemplary process for fingerprinting queries in accordance with the present invention.

Initially, the querying entity's system 200 receives, via input 215, a plaintext query, which is provided to processor 205 (step 605). Processor 205 then windows the plaintext query into shingles of length n with a sequential overlap of $k_Q=n-1$ (step 610). An example of this is illustrated in FIG. 7 where a collection of data 705 of the query is windowed into a set of shingles 710. The shingles are then formed into fingerprints using a cryptographic hashing algorithm (step 615). If the artifact fingerprints were salted, the query fingerprints would also be salted, using the same salt, prior to cryptographic hashing. Although the method of FIG. 6 is described as being performed on the querying entity's system, fingerprinting the query can be performed on a third-party system because, as discussed above, the query need not be protected.

Figure 8:
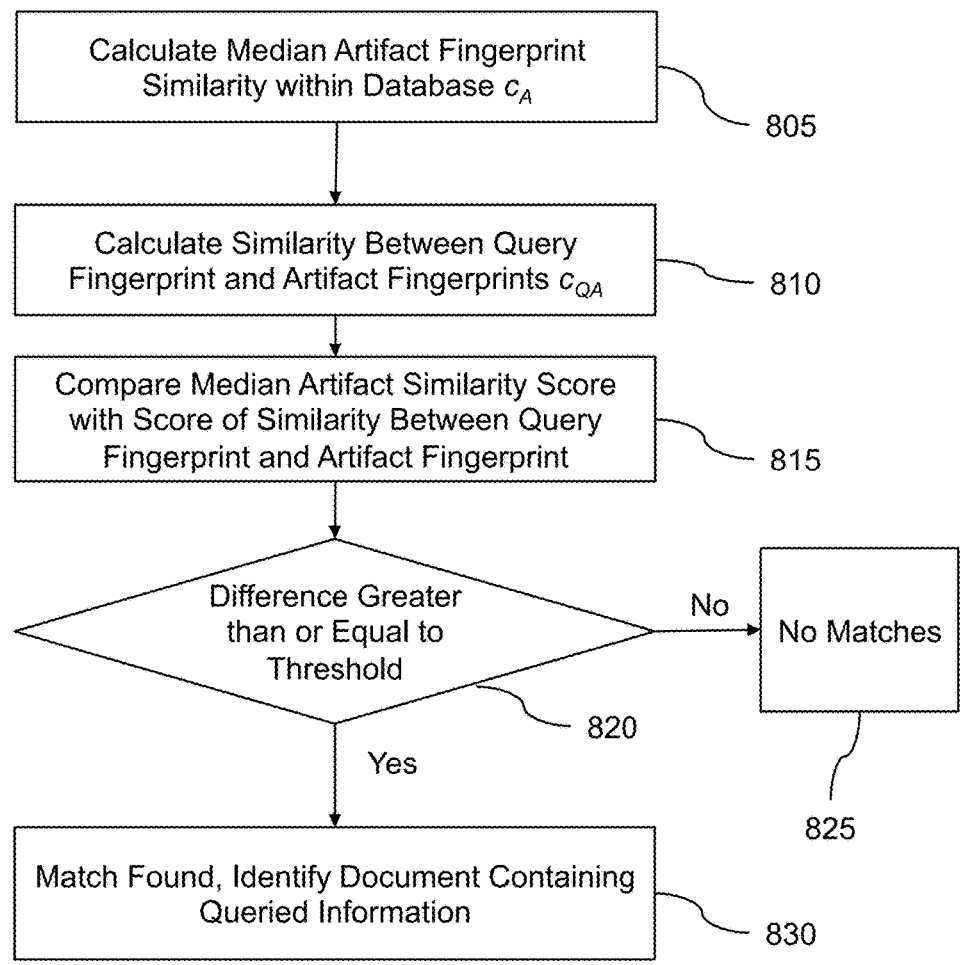
FIG. 8 is a flow diagram of an exemplary process for identifying whether a queried fingerprint is contained within fingerprinted artifacts in accordance with the present invention.

Now that the artifact and query fingerprints have been created these can be compared using the method of FIG. 8. Exemplary embodiments of the present invention treat the fingerprints as uniformly weighted vector spaces and the similarity between fingerprints is calculated as the cosine distance between two fingerprints. Thus, the cosine distance is used in the present invention as a similarity score indicating the likelihood of a match between fingerprints. In contrast to other weighting schemes the present invention does not presume any knowledge of the fingerprints. The uniform weighting provides a relatively simple way to compute the distance between two fingerprints. If S is defined as the set of query fingerprints, T as the set of fingerprints for a particular artifact, and $k_Q$ and $k_A$ as the overlap parameters between the query and artifact fingerprints, the cosine distance in this uniform weighting scheme is defined as:

$$c = \frac{|S \cap T|}{\sqrt{|S|}\sqrt{|T|}}$$

The distance score c can be used for both fingerprint similarity as well as to rank database search results. Specifically, the value c between a set of query fingerprints and the fingerprints of a particular artifact may be large enough to be significant on its own, whereas in some situations the relative values of c between the set of query fingerprints and a plurality of different sets of artifact fingerprints ranked according to lowest distance may provide a more useful indication of significance of any particular artifact relative to the query. Since the amount of overlap between adjacent tiles k is different for query fingerprint and the artifact fingerprints the distance score c will never reach a unity value.

Because the present invention uses different overlaps for the query and artifacts (i.e., $k_Q \neq k_A$) then the cosine distance will only vary between 0 and $$\sqrt{\frac{n - k_A}{n - k_Q}}.$$

Using the example above where n=7, $k_A$=6, and $k_Q$=0, the scores would only vary between 0 and 0.3778. Accordingly, using these parameters the closer a cosine distance score is to 0.3778 the more likely it is that there is a match. If desired the all scores can be adjusted by a factor proportional to n and the difference between $k_Q$ and $k_A$ so that the scores are distributed between 0 and 1, which is the range of values when the same overlap is used for the query and artifacts (i.e., $k_Q=k_A$). Regardless of the particular weighting scheme, so long as $k_Q$ and $k_A$ remain constant throughout the system all scores will be adjusted equally across database comparisons so that relative scores between the query and artifacts remain useful.

Accordingly, first a median artifact fingerprint similarity score $c_A$ is calculated within the database using the cosine distance calculation (step 805). Next, a similarity score between the set of query fingerprints and the artifact fingerprints $c_{QA}$ is calculated using the cosine distance calculation (step 810), which produces a set of similarity values c for each comparison between the set of query fingerprints and each fingerprint stored in the database. The median artifact similarity score $c_A$ is compared to the similarity score between the query fingerprint and the artifact fingerprints $c_{QA}$ (step 815) to determine whether the difference between these scores is greater than or equal to a threshold value (step 820). The threshold used here is designed to balance occurrences of false matches against missed matches. Thus, one skilled in the art can set the threshold to the desired balance between these two by, for example, setting it to the top 1% quantile value, thus eliminating 99% of the scores as false matches.

When the difference between these similarity scores is less than the threshold ("No" path out decision step 820), then there are no matches (step 825), and an indication of this is output. If, however, the difference between the similarity scores is greater than or equal to the threshold ("Yes" path out of decision step 820), then a match has been found and the unique artifact identifier for the matching artifact fingerprint is output (step 830). Specifically, referring again to FIG. 5A, the artifact fingerprint having a similarity score greater than or equal to the threshold is searched in the database using the row value and the artifact fingerprint having the matching row value is examined to identify the artifact ID in the column qualifier field. The querying entity will also be provided with an identification of the entity that provided the matching artifact to the artifact database so that the querying entity can contact the artifact providing entity to request a plaintext form of the underlying artifact. It should be recognized that plaintext form does not necessarily mean the provided artifact includes no formatting but instead that it is in an unprotected form that is viewable by the querying entity.

The identification of the artifact providing entity can be achieved in any number of different ways. For example, an identification of the artifact providing entity can be stored along with the unique artifact ID and/or a separate table can maintain an association between an artifact providing entity and all of the unique artifact IDs for the artifacts submitted by that entity. Further, providing the identified artifact in plaintext form does not necessarily mean that it is transmitted in plaintext form (although this can be done if so desired). For example, the entity that provided the artifact can encrypt the plaintext artifact and transmit the encrypted artifact to the querying entity, which can then decrypt it to obtain the plaintext artifact. Any type of encryption can be employed, such as public-private pair key encryption, private key—private key encryption, etc.

In order to appreciate the operation of the present invention, as well as how to interpret the similarity scores, two examples of implementations of the present invention will now be presented.

EXAMPLE 1

A first implementation can involve using Charles Dickens' Tale of Two Cities and Miguel de Cervantes' Don Quixote as two separate artifacts. These two texts can be separately fingerprinted using the method described above in connection with FIG. 3. The following query can then be fingerprinted using the method of FIG. 6:

It was the best of times
it was the worst of times
it was the age of wisdom
it was the age of foolishness It will be recognized that this query is a direct quote taken from the beginning of Tale of Two Cities. The cosine distance calculation described above can be performed separately for the fingerprinted query and the two fingerprinted artifacts, which could result in similarity scores of Don Quixote=0.0016376817020082647; Tale of Two Cities=0.008143011160437408. In the abstract the similarity score for Tale of Two Cities appears quite small. This is due to the fact that although the query is a direct quote from Tale of Two Cities, it only appears once in the entire text. However, when this similarity score is compared to the similarity score for Tale of Two Cities is five times greater than for Don Quixote. An appropriately selected threshold for step 820 would indicate that a match for the query was found in Tale of Two Cities but not in Don Quixote.

EXAMPLE 2

A second implementation could involve a subset of emails made public by the Federal Energy Regulatory Commission (FERC) during its investigation of Enron Corporation. These e-mails could be stored on a Hadoop cluster of 10 nodes having a total of 80 TB of storage. The subset could be used as the artifacts consisting of 3,000 e-mails from the larger set made available by FERC. These e-mails can be fingerprinted as the artifacts as a Map-Reduce job using the Apache Pig platform. The query could be a single e-mail from this dataset that had two near duplicates, the difference being the e-mails were stored in different folders of the user's email account. FIG. 9A illustrates the header of the e-mail that could be used as the query and FIGS. 9B and 9C illustrate headers of the two near duplicates. The different storage locations of these e-mails are described in the "X-Folder:" field. The bodies of these e-mails can be identical.

Figure 10:
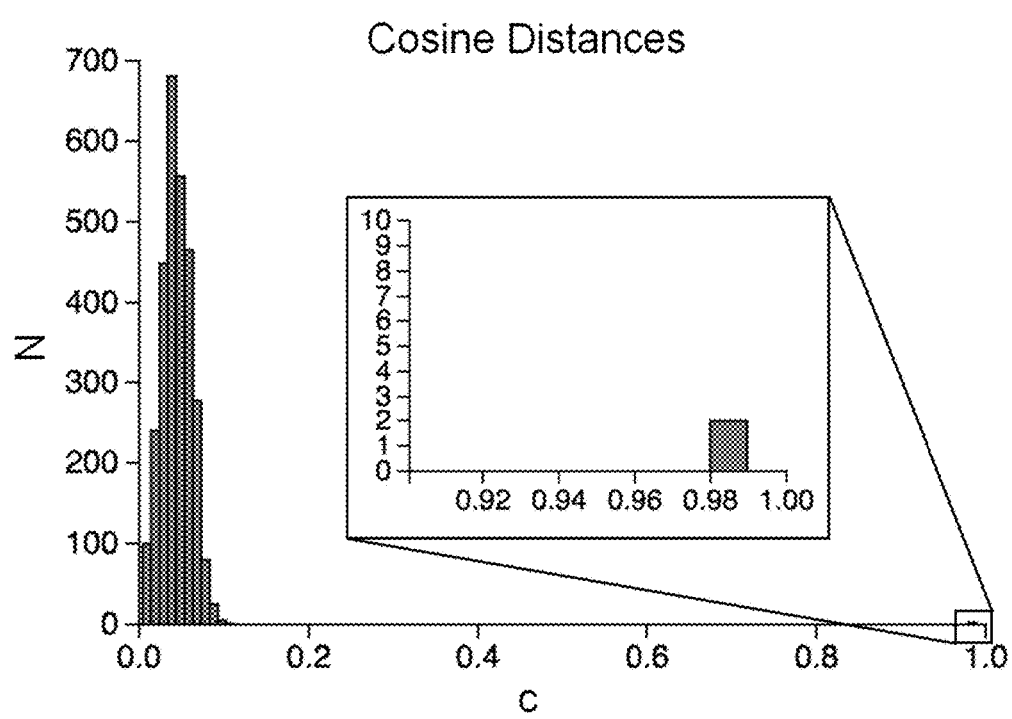
FIG. 10 is a histogram of cosine distances between stored e-mail artifacts and between a test e-mail artifact and other stored e-mail artifacts.

The median similarity score calculated in step 805 can be 0.04326. The fingerprinted query can then be compared to each of the 3,000 individual fingerprinted artifact e-mails and the two near duplicates can produce similarity scores of 0.9896 and 0.9874. These similarity scores are illustrated in FIG. 10, where it can be seen that there is a significant difference between the median similarity score and the similarity scores of the two near duplicates. Thus, the similarity scores of the two near duplicates can indicate a high likelihood that these e-mails contain the queried information, which is also can be indicated by the substantial difference between these similarity scores and the median similarity score. Accordingly, these two separate evaluations of the similarity scores provide a high degree of confidence that the two near duplicates contain the queried information.

As will be appreciated from the discussion above, exemplary embodiments of the present invention provide advantageous techniques for identifying matches between a query and a set of artifacts in a way that ensures the security of the artifacts so that the operator of the database containing the artifacts and the querying entity typically cannot determine the original unprotected artifacts. Instead, a fingerprinted artifact containing some or all of the query is identified and an identification of the artifact and the entity that provided the artifact can be provided to the querying entity. The querying entity can then take any further action, such as contacting the entity that submitted the artifact to request an unprotected version of the artifact.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method, comprising:
receiving, by a processor, a plurality of artifact fingerprints generated from a plurality of artifacts, wherein the plurality of artifact fingerprints are generated by
generating shingles from text within each of the plurality of artifacts; and
cryptographically hashing the shingles to generate a plurality of artifact fingerprints;
storing the artifact fingerprints in a database;
receiving, by the processor, at least one query fingerprint from a querying entity;
determining, by the processor, whether the received at least one query fingerprint matches any of the artifact fingerprints stored in the database; and
outputting an indication of an entity that provided an artifact containing a matched fingerprint to the querying entity without revealing plaintext of the artifact containing the matched fingerprint,
wherein the plurality of artifact fingerprints are received from a plurality of different entities.

2. The method of claim 1, wherein the determination of whether the received at least one query fingerprint matches any of the stored artifact fingerprints comprises:
generating, by the processor, a plurality of query vectors from at least one cryptographically hashed shingle of the query fingerprint;

generating, by the processor, a plurality of artifact vectors from the artifact fingerprints;

performing, by the processor, a cosine distance calculation using the plurality of query vectors and the plurality of artifact vectors to generate a plurality of distance scores; and selecting, by the processor, a vector of the plurality of artifact vectors having a lowest distance score.

3. The method of claim 2, further comprising:

determining, by the processor, a median cosine distance for the plurality of artifact vectors, wherein the median cosine distance is used to set a threshold against which the lowest distance score is compared to determine whether the vector of the plurality of artifact vectors having the lowest distance score is a match of one or more of the query vectors.

4. The method of claim 1, wherein the processor and database are maintained by an entity that is independent of the plurality of different entities that provided the plurality of fingerprints and independent of the querying entity and the plurality of artifact fingerprints are generated by each of the plurality of different entities or are generated by the processor that receives the artifacts from the plurality of different entities.

5. The method of claim 1, wherein the processor and database are maintained by the querying entity and the plurality of fingerprints are generated by each of the plurality of different entities or generated by an entity that is independent of the plurality of different entities and independent of the querying entity.

6. The method of claim 1, wherein the at least one query fingerprint is generated by:

receiving a plaintext query;

generating a plurality of query shingles from the plaintext query so that character overlap between adjacent shingles is greater than a character overlap between adjacent shingles of the plurality of artifact fingerprints;

cryptographically hashing the plurality of query shingles to form a plurality of query fingerprints.

7. The method of claim 6, wherein the shingles generated from the text within each of the plurality of artifacts and the shingles generated from the plaintext query are salted prior to the cryptographic hashing.

8. The method of claim 1, wherein prior to cryptographically hashing the shingles generated from the text within each of the plurality of artifacts, the method further comprises:

comparing the shingles generated from the text within each of the plurality of artifacts to a stop word list; and removing any shingle of the shingles generated from the text within each of the plurality of artifacts that match a word in the stop word list.

9. The method of claim 1, wherein prior to determining whether the received at least one fingerprint matches any of the artifact fingerprints stored in the database, the method comprises:

receiving a set of artificially common fingerprints; and removing any fingerprints from the stored artifact fingerprints matching any of the fingerprints in the set of artificially common fingerprints.

10. The method of claim 1, wherein the database storing the artifact fingerprints is a distributed key store.

11. The method of claim 1, further comprising:

contacting, by the querying entity, the entity that provided the artifact containing the matched fingerprint to obtain a plaintext version of the artifact containing the matched fingerprint.

12. The method of claim 11, further comprising:

encrypting, by the contacted entity, the artifact containing the matched fingerprint;

transmitting the encrypted artifact to the querying entity; and decrypting, by the querying entity, the encrypted artifact to obtain the plaintext version of the artifact containing the matched fingerprint.

13. A method, comprising:

receiving, by a processor, a plurality of artifact fingerprints generated from a plurality of artifacts, wherein the plurality of artifact fingerprints are generated by generating shingles from text within each of the plurality of artifacts so that there at least one character overlap between adjacent shingles; and cryptographically hashing the shingles to generate a plurality of artifact fingerprints;

storing the artifact fingerprints in a database;

receiving, by the processor from a querying entity, a plurality of query fingerprints generated by cryptographically hashing shingles of a plaintext query, wherein a character overlap between shingles generated from the plaintext query is greater than the at least one character overlap of the shingles generated from the artifacts;

determining, by the processor, whether any of the query fingerprints match any of the artifact fingerprints stored in the database by performing a cosine distance calculation; and outputting an indication of an entity that provided an artifact containing a matched fingerprint to the querying entity without revealing plaintext of the artifact containing the matched fingerprint.

14. The method of claim 13, wherein the cosine distance calculation is performed between each of the artifact fingerprints stored in the database to produce a median artifact similarity score, the cosine distance calculation is performed between each of the plurality of query fingerprints and each of the artifact fingerprints to produce individual query fingerprint scores, and a match between any of the query fingerprints and any of the artifact fingerprints is determined based on both the median artifact similarity score and the individual query fingerprint similarity scores.

15. The method of claim 13, wherein there is no character overlap between shingles generated from the plurality of artifacts.

16. The method of claim 13, wherein the processor and database are controlled by a first entity that is different from the querying entity, and wherein the plurality of query fingerprints are generated by:

receiving, by a second processor from the second entity, a plaintext query;

generating, by the second processor, a plurality of query shingles from the plaintext query;

cryptographically hashing, by the second processor, the plurality of query shingles to form the plurality of query fingerprints.

17. The method of claim 13, wherein prior to cryptographically hashing the shingles generated from the text within each of the plurality of artifacts, the method further comprises:

comparing, by the processor, the plurality of shingles generated from the text within each of the plurality of artifacts to a stop word list; and removing, by the second processor, any shingle of the shingles generated from the text within each of the plurality of artifacts matching a word in the stop word list.

18. The method of claim 16, wherein prior to determining whether any of the received query fingerprints match any of the artifact fingerprints stored in the database, the method comprises:
receiving, by the processor, a set of artificially common fingerprints; and
removing, by the second processor, any fingerprints from the plurality of artifact fingerprints matching any of the fingerprints in the set of artificially common fingerprints.

19. A method, comprising:
receiving, by a processor, a plurality of artifact fingerprints generated from a plurality of artifacts, wherein the plurality of artifact fingerprints are generated by
generating shingles from text within each of the plurality of artifacts; and
cryptographically hashing the shingles to generate a plurality of artifact fingerprints;
storing the artifact fingerprints in a database;
receiving, by the processor, at least one query fingerprint from a querying entity;
determining, by the processor, whether the received at least one query fingerprint matches any of the artifact fingerprints stored in the database; and
outputting an indication of an entity that provided an artifact containing a matched fingerprint to the querying entity without revealing plaintext of the artifact containing the matched fingerprint.

20. The method of claim 19, wherein the at least one query fingerprint is generated by:
receiving a plaintext query;
generating a plurality of query shingles from the plaintext query so that character overlap between adjacent shingles is greater than a character overlap between adjacent shingles of the plurality of artifact fingerprints;
cryptographically hashing the plurality of query shingles to form a plurality of query fingerprints.

21. The method of claim 19, wherein prior to cryptographically hashing the shingles generated from the text within each of the plurality of artifacts, the method further comprises:
comparing the shingles generated from the text within each of the plurality of artifacts to a stop word list; and
removing any shingle of the shingles generated from the text within each of the plurality of artifacts that match a word in the stop word list.

22. The method of claim 19, wherein the determination of whether the received at least one query fingerprint matches any of the stored artifact fingerprints comprises:
generating, by the processor, a plurality of query vectors from the at least one cryptographically hashed shingle;
generating, by the processor, a plurality of artifact vectors from the artifact fingerprints;
performing, by the processor, a cosine distance calculation using the plurality of query vectors and the plurality of artifact vectors to generate a plurality of distance scores; and
selecting, by the processor, a vector of the plurality of artifact vectors having a lowest distance score.

23. The method of claim 22, further comprising:
determining, by the processor, a median cosine distance for the plurality of artifact vectors, wherein the median cosine distance is used to set a threshold against which the lowest distance score is compared to determine whether the vector of the plurality of artifact vectors having the lowest distance score is a match of one or more of the query vectors.

\* \* \* \* \*